(12) United States Patent
Iinuma

(10) Patent No.: US 8,804,199 B2
(45) Date of Patent: Aug. 12, 2014

(54) IMAGE PROCESSING APPARATUS, IMAGE PROCESSING METHOD AND STORAGE MEDIUM

(75) Inventor: Osamu Iinuma, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 858 days.

(21) Appl. No.: 12/946,616

(22) Filed: Nov. 15, 2010

(65) Prior Publication Data

US 2011/0141529 A1 Jun. 16, 2011

(30) Foreign Application Priority Data

Dec. 15, 2009 (JP) .................................. 2009-284569

(51) Int. Cl.
| | |
|---|---|
| *H04N 1/60* | (2006.01) |
| *H04N 1/04* | (2006.01) |
| *H04N 1/407* | (2006.01) |
| *H04N 1/56* | (2006.01) |
| *G06F 3/12* | (2006.01) |
| *G03F 3/00* | (2006.01) |
| *B41J 2/36* | (2006.01) |

(52) U.S. Cl.
USPC ......... 358/3.21; 358/1.9; 358/1.13; 358/1.15; 358/501; 358/504; 358/505; 358/518; 358/519; 358/521; 358/401; 358/406

(58) Field of Classification Search
CPC ....................................................... B41J 2/362
See application file for complete search history.

(56) References Cited

U.S. PATENT DOCUMENTS

| | | | |
|---|---|---|---|
| 8,379,247 B2* | 2/2013 | Cahill et al. | 358/1.15 |
| 2004/0114157 A1* | 6/2004 | Linder et al. | 358/1.9 |
| 2005/0232655 A1* | 10/2005 | Syouichiro | 399/130 |
| 2007/0030525 A1* | 2/2007 | Ono | 358/406 |
| 2008/0123121 A1* | 5/2008 | Sagimori | 358/1.9 |
| 2009/0086234 A1* | 4/2009 | Oles | 358/1.9 |
| 2009/0116073 A1* | 5/2009 | Nakamura | 358/3.23 |
| 2009/0147291 A1* | 6/2009 | Kobashigawa | 358/1.13 |
| 2010/0054775 A1* | 3/2010 | Nakase | 399/49 |

FOREIGN PATENT DOCUMENTS

| | | | |
|---|---|---|---|
| JP | 2000-132013 A | 5/2000 | |
| JP | 2001-180090 A | 7/2001 | |
| JP | 2005-275378 A | 10/2005 | |
| JP | 2008-058415 A | 3/2008 | |

\* cited by examiner

*Primary Examiner* — King Poon
*Assistant Examiner* — Beniyam Menberu
(74) *Attorney, Agent, or Firm* — Carter, DeLuca, Farrell & Schmidt, LLP

(57) ABSTRACT

An image processing apparatus connected via a network to a plurality of image forming apparatuses that implement a first gradation correction, or a second gradation correction. The image processing apparatus includes a selection unit configured to select the first gradation correction or second gradation correction, for each of the connected plurality of image forming apparatuses, an instruction unit configured to send an instruction to an image forming apparatus for which a first gradation correction has been selected by the selection unit, a reading unit configured to read out patch patterns that have been printed by the image forming apparatus for which the second gradation correction has been selected, and a transmission unit configured to transmit data for correcting readout values of the patch patterns to the image forming apparatus for which the second gradation correction has been selected.

13 Claims, 21 Drawing Sheets

FIG. 6

| NAMES OF IMAGE FORMING APPARATUSES | TYPES OF GRADATION CORRECTIONS |
|---|---|
| IMAGE FORMING APPARATUS A | INTERNAL |
| IMAGE FORMING APPARATUS B | SCANNER |
| IMAGE FORMING APPARATUS C | SCANNER |
| | ⋮ |
| IMAGE FORMING APPARATUS X | SCANNER |

FIG. 15

| NAMES OF IMAGE FORMING APPARATUSES | TYPES OF GRADATION CORRECTIONS | TYPES OF PATCHES |
|---|---|---|
| IMAGE FORMING APPARATUS A | INTERNAL | |
| IMAGE FORMING APPARATUS B | SCANNER | NORMAL |
| IMAGE FORMING APPARATUS C | SCANNER | NORMAL |
| ... | ... | ... |
| IMAGE FORMING APPARATUS X | SCANNER | ONLY IMAGE FORMATION "A" |

FIG. 19

| NAMES OF IMAGE FORMING APPARATUSES | TYPES OF GRADATION CORRECTIONS |
|---|---|
| ★ IMAGE FORMING APPARATUS A | PAPER OUTPUT |
| IMAGE FORMING APPARATUS B | PAPER OUTPUT |
| IMAGE FORMING APPARATUS C | PAPER OUTPUT |
| | . . . |
| IMAGE FORMING APPARATUS X | PAPER OUTPUT |

FIG. 21

| NETWORK AUTOMATIC GRADATION CORRECTION | | | |
|---|---|---|---|
| REGISTER INFORMATION ABOUT THE FOLLWING DEVICES | | | |
| NAMES OF MODELS | SPEC | | INSTALLATION LOCATION |
| IMAGE FORMING APPARATUS A | LOW-SPEC | ▼ | THIRD OFFICE ROOM ▼ |
| IMAGE FORMING APPARATUS B | HIGH-SPEC | ▼ | SECOND OFFICE ROOM ▼ |
| IMAGE FORMING APPARATUS C | HIGH-SPEC | ▼ | SECOND OFFICE ROOM ▼ |

— 2101
— 2102

COMPLETED
2103

IMAGE PROCESSING APPARATUS, IMAGE PROCESSING METHOD AND STORAGE MEDIUM

BACKGROUND OF THE INVENTION

1. Field of the Invention

The present invention relates to an image processing apparatus, when collectively performing gradation corrections of image forming apparatuses existing in a large number on a network, that selects a method for gradation correction for each image forming apparatus, and performs gradation corrections of the image forming apparatuses on the network.

2. Description of the Related Art

A multifunction peripheral (MFP) or a printer that combines copying, printing, and facsimile functionalities, has accelerated colorization in offices. In a MFP or a printer, density characteristics are varied depending on its usage frequency and usage environment. As a technique for improving the variation, gradation correction is available. There are two main methods for generating gradation correction data. One is a method for generating the gradation correction data by outputting a paper on which patch patterns for gradation correction have been printed, from the MFP or the printer, and reading gradation correction patch patterns on the paper using a reading apparatus (e.g., a scanner of MFP or a densitometer on the market). Another is a method for generating the gradation correction data, by printing patch patterns for gradation correction from an MFP or a printer on a transfer belt arranged within the MFP or the printer, and reading them using a sensor arranged internally thereof.

A work for generating the gradation correction data, especially a method for generating the gradation correction data through paper output, places a burden on a user. This is because, the user itself must acquire the patch patterns output on the paper, from an output destination, and load the patch patterns into the reading apparatus. Japanese Patent Application Open-Laid No. 2008-058415 discusses an implementation of gradation correction in which a time required for corrections is reduced by reducing a number of patch patterns for gradation correction, where necessary. However, easing a work burden of the user by selecting either one of the above-described two gradation correction methods taking status of each image forming apparatus into consideration, has not yet been discussed.

SUMMARY OF THE INVENTION

According to the exemplary embodiment of the present invention, when gradation corrections of MFPs or printers that exist on a network are performed, situations of respective MFPs or printers connected via the network can be determined, and gradation corrections in line with the situations of respective MFPs or printers can be selected and executed. Accordingly, it becomes possible to keep precision of density characteristics with respect to respective MFPs or printers, while reducing the burden on the user.

According to an aspect of the present invention, an image processing apparatus connected via a network to a plurality of image forming apparatuses that implement a first gradation correction, or a second gradation correction, for instructing the connected plurality of image forming apparatuses to implement gradation corrections, the image processing apparatus includes a selection unit configured to select the first gradation correction or second gradation correction, for each of the connected plurality of image forming apparatuses, an instruction unit configured to send an instruction, to an image forming apparatus connected via the network, for which a first gradation correction has been selected by the selection unit, to form patch patterns on an image carrier of the image forming apparatus, to generate gradation correction data from data of the patch patterns read out by a sensor of the image forming apparatus, and to start gradation correction, and configured to instruct an image forming apparatus connected via the network, for which a second gradation correction has been selected, to print patch patterns on a paper, a reading unit arranged in a reading section by a user, configured to read out patch patterns that have been printed by the image forming apparatus connected via the network, for which the second gradation correction has been selected, and a transmission unit configured to transmit data for correcting readout values of the patch patterns to the image forming apparatus connected via the network, for which the second gradation correction has been selected.

Further features of the present invention will become apparent from the following detailed description of exemplary embodiments (with reference to the attached drawings).

BRIEF DESCRIPTION OF THE DRAWINGS

The accompanying drawings, which are incorporated in and constitute a part of the spec, illustrate exemplary embodiments, features, and aspects of the invention and, together with the description, serve to explain the principles of the invention.

FIG. 6 illustrates a report to be presented to a user.

FIG. 15 illustrates a report to be presented to a user.

FIG. 19 illustrates a report to be presented to a user.

FIG. 21 illustrates an example displayed on the UI screen.

DESCRIPTION OF THE EMBODIMENTS

Various exemplary embodiments, features, and aspects of the invention will be described in detail below with reference to the drawings.

Figure 1:
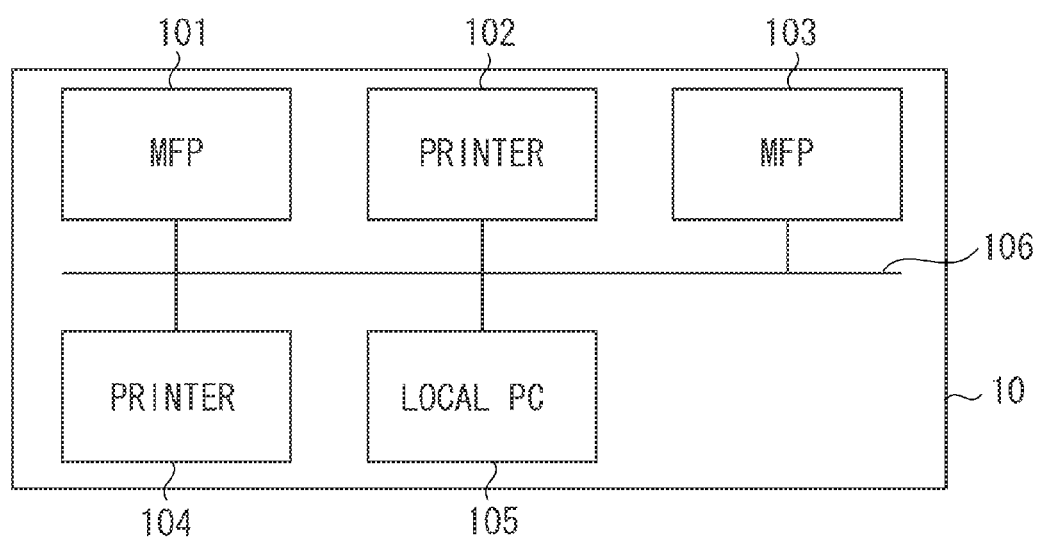
FIG. 1 is a block diagram illustrating an image processing system.

FIG. 1 is a block diagram illustrating an image processing apparatus according to an exemplary embodiment of the present invention. To a local area network (LAN) 106 constructed within an office 10, there are connected an MFP 101 serving as an image processing apparatus, an MFP 103 serving as an image forming apparatus, printers 102, 104 serving as image forming apparatuses, and a local personal computer (PC) 105. The MFP 101 serving as the image processing apparatus is a center machine capable of performing collectively gradation corrections of a plurality of MFPs or printers connected via the network. (hereinafter, performing collectively gradation corrections of a plurality of MFPs or printers connected onto the network is referred to as network automatic gradation correction).

Figure 2:
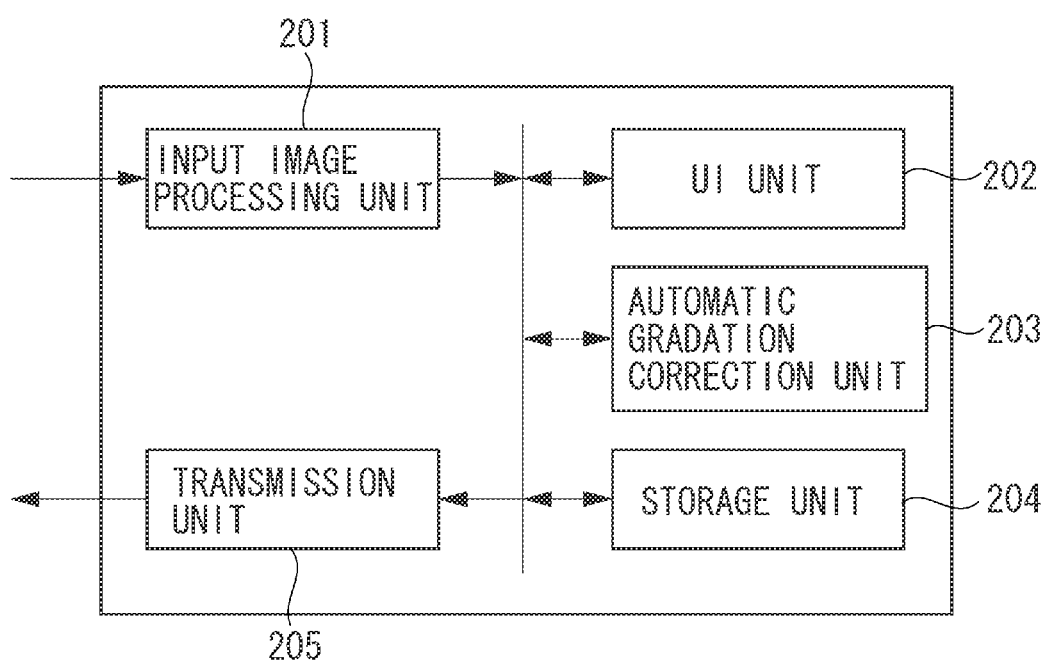
FIG. 2 is a block diagram illustrating a data processing apparatus.

FIG. 2 illustrates a configuration of a data processing apparatus mounted on the MFP 101. The data processing apparatus includes an input image processing unit 201, a UI unit 202, an automatic gradation correction unit 203, a storage unit 204, and a transmission unit 205.

Figure 3:
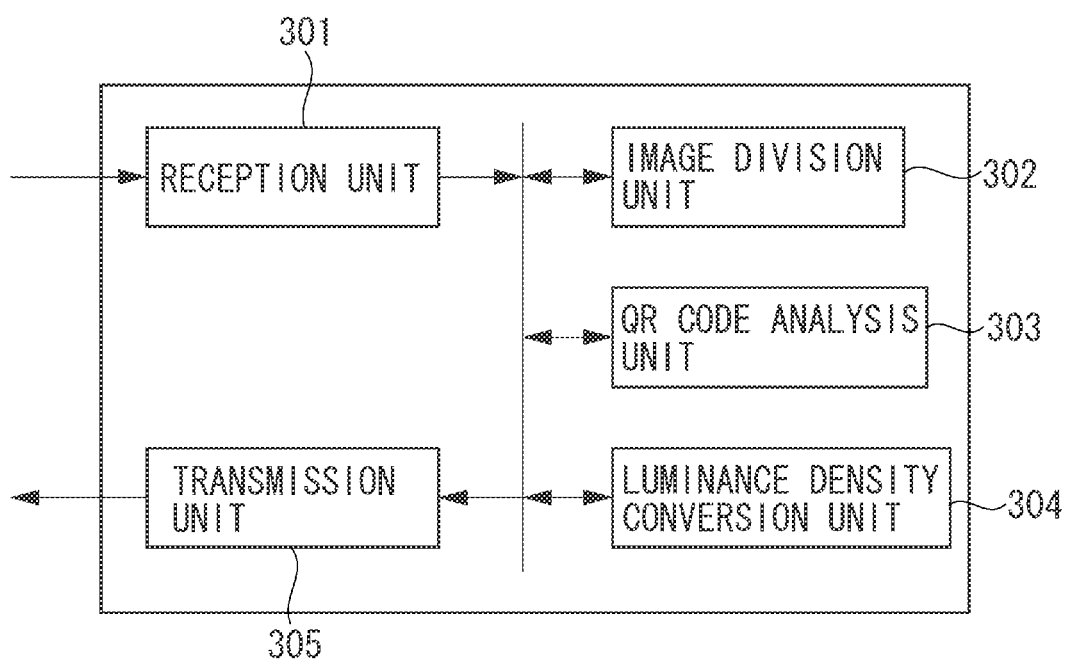
FIG. 3 is a block diagram illustrating an input image processing unit.

FIG. 3 illustrates a configuration of the input image processing unit 201 of FIG. 2. The input image processing unit 201 includes a reception unit 301, an image division unit 302, a QR code analysis unit 303, a luminance density conversion unit 304, and a transmission unit 305.

Figure 5:
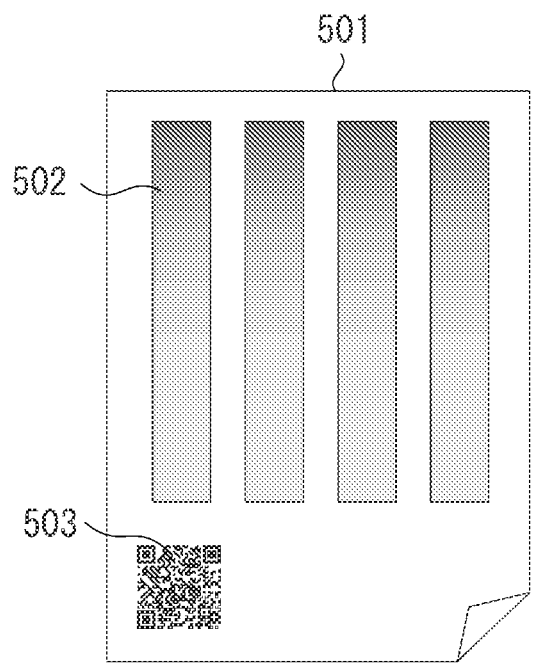
FIG. 5 illustrates an example of output print for gradation correction.

Two processing methods for gradation corrections used in description of the present exemplary embodiment will be described. FIG. 5 is a diagram representing an image of patch patterns for gradation correction that are printed out from the MFP 101 serving as the image forming apparatus.

Figure 13:
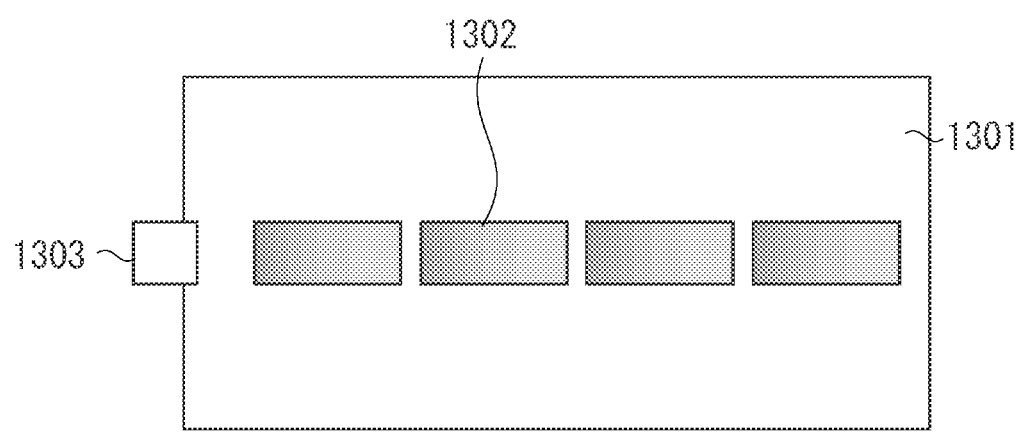
FIG. 13 illustrates an example of patch patterns for gradation correction printed on a transfer belt.

FIG. 13 is a diagram representing an image of patch patterns for gradation correction printed on a transfer belt within the image forming apparatus.

A first method for gradation correction is to perform print operation of patch patterns 502 for gradation correction that have been printed in respective colors (cyan, magenta, yellow, black) on papers in a plurality of image forming apparatuses connected on the network. When print operation is performed, it is necessary to perform print operation by all types of image forming methods that the image forming apparatuses possess. Moreover, a QR code 503 that has coded IP addresses and product names of respective MFPs or printers is printed. The user collects patch patterns as output print 501 that have been output for the purpose of gradation correction, from respective image forming apparatuses. Then, the user loads these print output product 501 on a scanner of the MFP 101 to scan them. Density characteristics of respective colors are obtained from luminance values of the patch patterns 502 for gradation correction that have been scanned and read out. The density characteristics of the respective colors and ideal density characteristics, which the image forming apparatuses have, are compared, gradation correction data is generated, and the gradation correction is performed using the data. The method described above is termed "gradation correction using the printed patch patterns on a paper (first gradation correction)".

In the QR code 503, as described below, IP addresses, and product names of the image forming apparatuses that have output the output print 501 are coded and recorded.

Another method for gradation correction is to print the patch patterns 1302 for gradation correction in respective colors (cyan, magenta, yellow, black) on an intermediate transfer belt 1301 or on an image carrier serving as a photosensitive member (not illustrated) arranged within respective image forming apparatuses. When print operation is performed, it is necessary to perform print operation using all types of image forming methods that the image forming apparatuses possess. Density characteristics of the printed patch patterns 1302 for gradation correction are acquired with a sensor 1303 arranged within the apparatus. The acquired density characteristics of respective colors and ideal density characteristics, which the image forming apparatuses have, are compared, and the gradation correction data is generated. The above-described method is termed "internal gradation correction (second gradation correction)".

When the gradation correction using the printed patch patterns on a paper and the internal gradation correction are compared, the gradation correction using the printed patch patterns on a paper has a greater number of gradations as to patch patterns to be used than that of the internal gradation correction. As a result, calculation precision of processing for corrections is higher than the latter. Hence, when the high precision of the gradation correction is required, the gradation correction using the printed patch patterns on a paper will be selected.

However, in a case where the gradation correction using the printed patch patterns on a paper is selected, as described above, the user itself must acquire patch patterns output on papers from output destinations, and load the patch patterns into the reading apparatus. As a result, a much burden is placed on the user. In that respect, in the internal gradation correction, since the patch patterns are printed on an image carrier such as a transfer belt instead of papers, the gradation correction can be performed without placing burden on the user.

Figure 4:
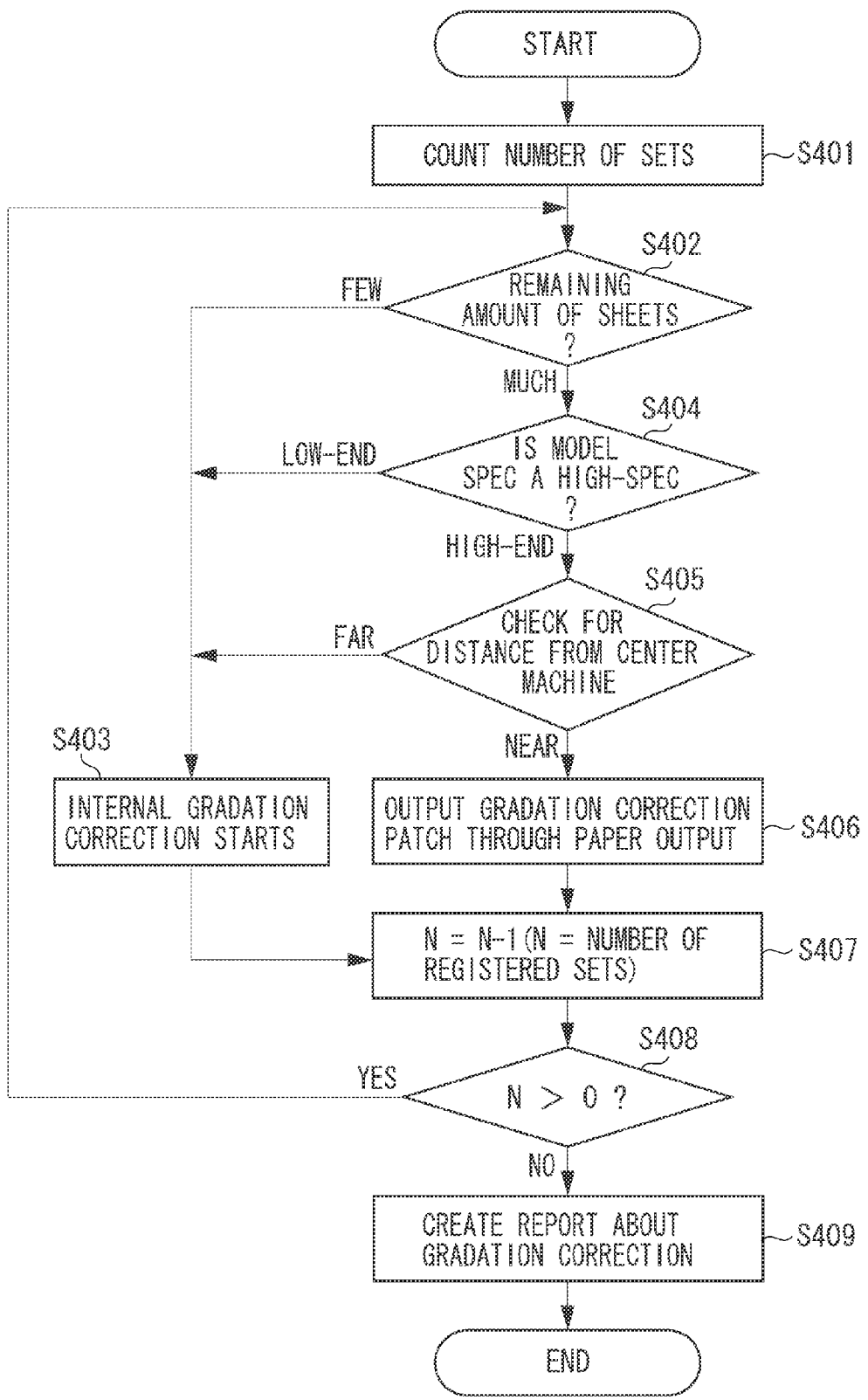
FIG. 4 is a flowchart illustrating a general outline according to the present first exemplary embodiment.

The flowchart for explaining characteristic processing according to the present exemplary embodiment is illustrated in FIG. 4. FIG. 4 is an explanatory view concerning the processing in which a center machine selects a gradation correction method to be executed, out of the two gradation correction methods described above, for the image forming apparatuses connected at the time of network automatic gradation correction. Respective processing routines in the flowchart are controlled by the automatic gradation correction unit 203 of the MFP 101.

Figure 14:
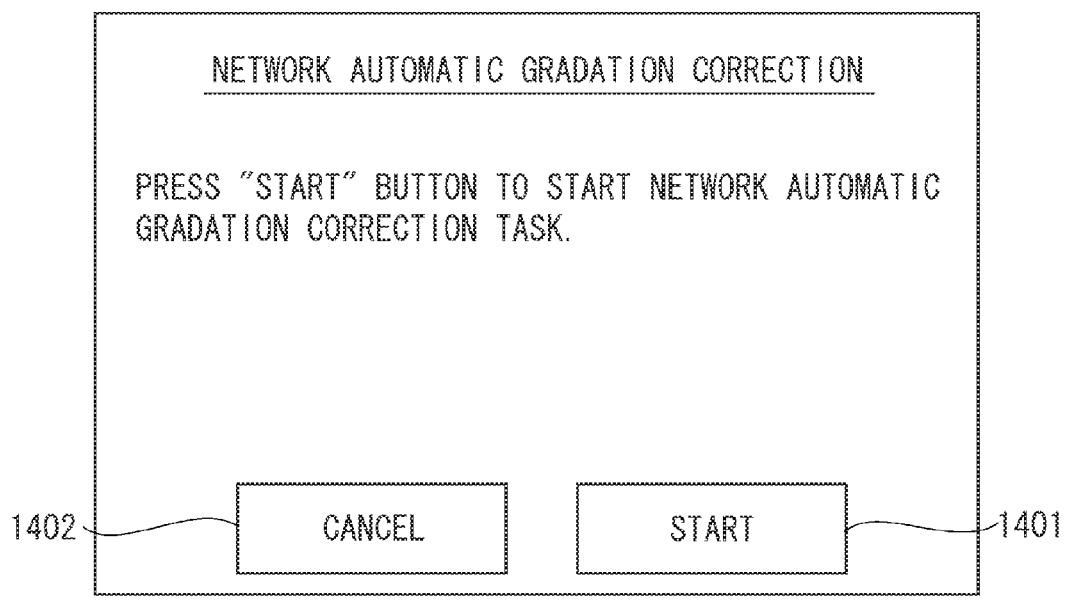
FIG. 14 illustrates an example displayed on the UI screen.

FIG. 6 and FIG. 14 each illustrate an example of image displayed on the UI unit 202 of the MFP 101 serving as the center machine. Hereinbelow, the present exemplary embodiment will be described in detail.

When a button 1401 is pressed from the UI screen as illustrated in FIG. 14 displayed on the control panel screen of the MFP 101, the UI unit 202 notifies the automatic gradation correction unit 203 that the network automatic gradation correction described below is started. Then the process proceeds to step S401. On the other hand, when a button 1402 is pressed, the network automatic gradation correction is canceled. When the process proceeds to step S401, the automatic gradation correction unit 203 counts a number of the image forming apparatuses connected on the network. In this case, the apparatus that is counted is an image forming apparatus registered as "image forming apparatus that performs network automatic gradation correction" described below.

The automatic gradation correction unit 203, upon completion of counting, starts examination to select one of the gradation correction methods for each of the image forming apparatuses. First, taking one image forming apparatus connected on the network as examination target, the automatic gradation correction unit 203 performs determination processing in the following steps S402 to S405. First, in step S402, the automatic gradation correction unit 203 checks a paper feeding stage of the image forming apparatus where papers to be used when performing the gradation correction using the printed patch patterns on a paper are stored. If a remaining amount of papers is few (FEW in step S402), the process proceeds to step S403.

Then, in step S403, the automatic gradation correction unit 203 instructs through the transmission unit 205 the image forming apparatus as the examination target to perform internal gradation correction. If a remaining amount of papers is much (MUCH in step S402), the process proceeds to step S404.

Then, in step S404, the automatic gradation correction unit 203 checks model spec of the image forming apparatus as the examination target. If the model spec is low-spec (LOW-END in step S404), it is determined that high gradation is not required, and the process proceeds to step S403.

Then, in step S403, the automatic gradation correction unit 203 instructs through the transmission unit 205 the image forming apparatus as the examination target to perform internal gradation correction. In step S404, if it is determined that the model spec is a high-spec (HGH-END in step S404), the process proceeds to step S405. The model with high-spec is a model in which multiple steps of image processing routines are set, or a model with a high resolution, for example. Regarding the model spec, a user may set it in advance, as described below.

Then, in step S405, the automatic gradation correction unit 203 checks a distance of the image forming apparatus of the examination target from the MFP 101 as the center machine. If it is determined that the distance from the center machine is far (FAR in step S405), then the process proceeds to step S403. Then, in step S403, the automatic gradation correction unit 203 instructs through the transmission unit 205 the image forming apparatus as the examination target to perform internal gradation correction. In step S404, if it is determined that the distance is near (NEAR in step S405), then the process proceeds to step S406. Then, in step S406, the automatic gradation correction unit 203 instructs through the transmission unit 205 the image forming apparatus as the examination target to print out the output print 501 for performing the gradation correction using the printed patch patterns on a paper using these determination results.

Further, the automatic gradation correction unit 203, instead of performing all of the determination processing routines insteps S402 to S405, may perform processing selected out of these routines to make the determination. For example, in step S402, if much amount of papers remain, the process may directly proceed to step S406, and it may be determined to perform the gradation correction using the printed patch patterns on a paper.

The above-described determination processing routines are simplified by performing sequentially the processing routines. In steps S407 and S408, the automatic gradation correction unit 203 checks whether selections of the gradation correction methods are completed for all the image forming apparatuses checked in step S401. If not completed (YES in step S408), the processing routines in step S402 and afterward are repeated. If completed (NO in step S408), then the process proceeds to step S409. In step S409, the automatic gradation correction unit 203 creates a report as illustrated in FIG. 6. More specifically, whether the internal gradation correction is to be performed or the gradation correction using the printed patch patterns on a paper is to be performed, for each of the image forming apparatuses, is saved in the storage unit 204.

The automatic gradation correction unit 203 performs again the above-described determination in the image forming apparatus that has saved the report of the determination. If the result differs from the saved report, the automatic gradation correction unit 203 may display warning UI to the user. An image forming apparatus which has a high-spec, for example, and is in the near distance from the center machine, should perform normally the correction processing through paper output. However, in such image forming apparatus, when the above-described determination is performed at the time when the remaining amount of papers is few, then in step S402, it will be eventually determined that the internal gradation correction is to be performed.

In contrast, if the preceding determination result is saved, then in a case where difference from the current result arises (a case where difference arises in the determination result of the remaining amount of papers in step S402 is mainly conceivable), gradation processing can be performed by the normal method if the warning UI is issued. More specifically, it is only necessary for the user to replenish papers to the paper feeding stage, and change setting of model spec, for the image forming apparatus as to which it is determined that the internal gradation correction is to be performed.

Figure 17:
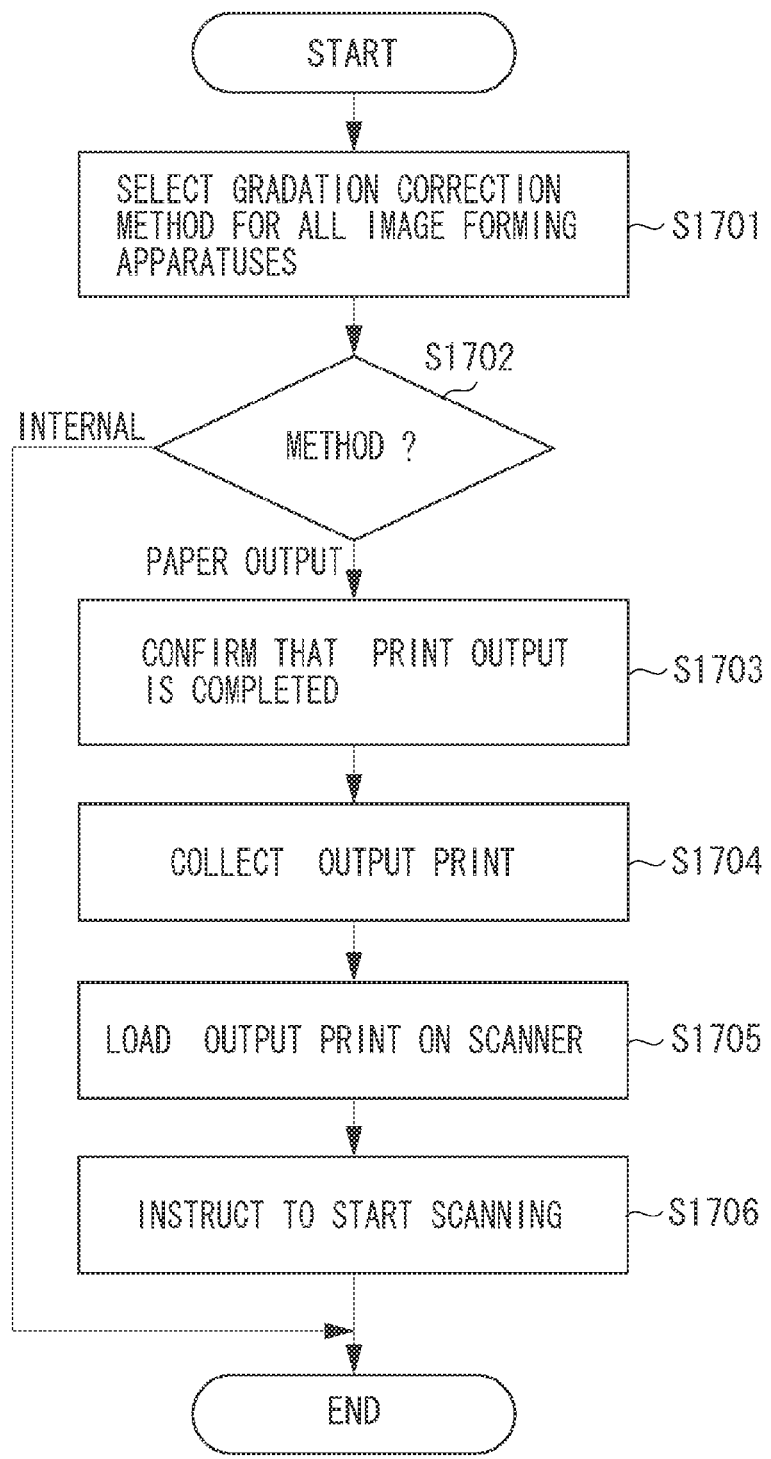
FIG. 17 is a flowchart illustrating a general outline according to the present first exemplary embodiment.

FIG. 17 illustrates a flowchart concerning procedure for the network automatic gradation correction. In step S1701, the MFP 101 serving as the center machine selects gradation correction methods of the image forming apparatuses on the network. The registrations for performing the network automatic gradation correction have been made to the image forming apparatuses. The details of the processing here is as described in FIG. 4.

In step S1702, the user checks whether an image forming apparatus, for which the gradation correction using the printed patch patterns on a paper has been selected, exists on the network. Next, in step S1703, the user checks whether the output print 501 for gradation correction is printed out for all the image forming apparatuses, for which the gradation correction using the printed patch patterns on a paper has been selected.

Then, in step S1704, the output print 501 for gradation correction is collected by the user from paper discharge ports of all the image forming apparatuses, for which the gradation correction using the printed patch patterns on a paper has been selected.

In step S1705, all the output print 501 collected by the user is put on an auto document feeder (ADF) installed on the scanner of the MFP 101 by the user.

In step S1706, when instruction of scan start is issued by the user via the control panel screen of the MFP 101, the scanner performs in sequence reading of the print output product 501.

Figure 20:
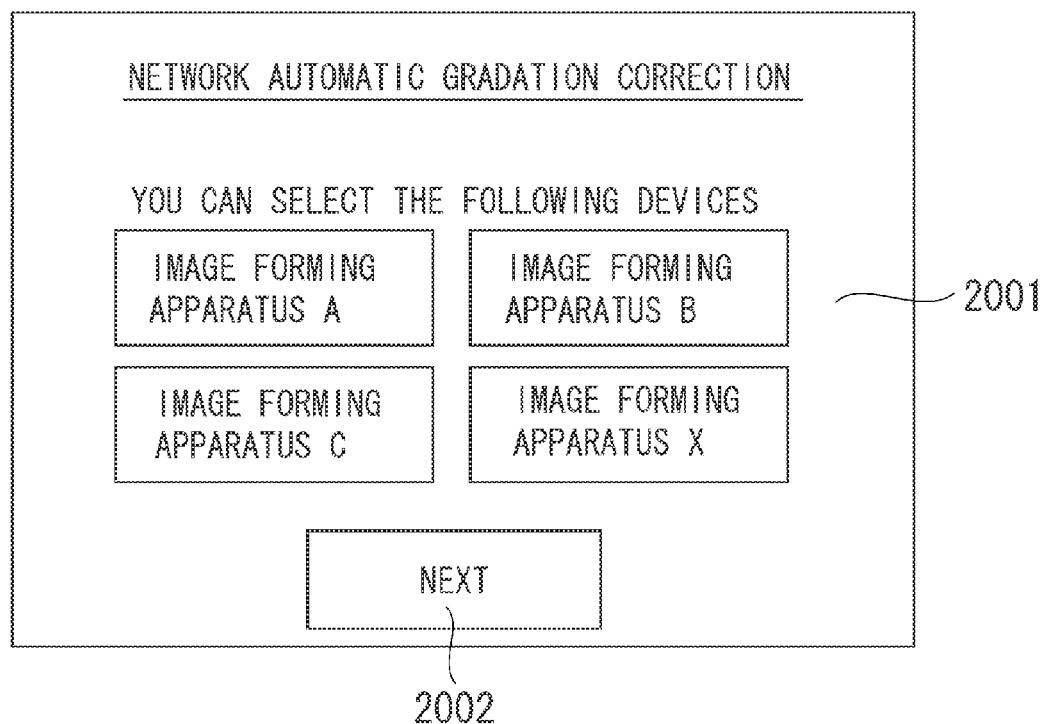
FIG. 20 illustrates an example displayed on the UI screen.

FIG. 20 and FIG. 21 illustrate examples of images displayed on the UI unit 202 of the MFP 101 serving as the center machine.

The user registers the image forming apparatuses that perform network automatic gradation correction via the image in FIG. 20 displayed on the UI unit 202. Only the image forming apparatuses that have registered are counted as targets of the network automatic gradation corrections. On an area 2001, a list of the image forming apparatuses that exist on the network is displayed. The user presses the image forming apparatus that performs the network automatic gradation correction out of these apparatuses. Next, when a button 2002 is pressed, the image in FIG. 21 is displayed on the UI unit 202. On an area 2101, the image forming apparatus that performs network automatic gradation correction is displayed. Descriptions of respective image forming apparatuses are displayed at the same time.

Although items concerning spec are automatically determined from an image formation model name, the user may select spec by pressing a pull-down menu button of the button 2102. Further, installed location is selected by pressing a pull-down menu button of the button 2102 from a list of the locations registered in advance. The automatic gradation correction unit 203 automatically calculates a distance between the selected location and the MFP 101 serving as the center machine, and stores the calculated results therein. Further, in the registration, the MFP 101 serving as the center machine may be registered as a target machine of the network automatic gradation correction.

Figure 7:
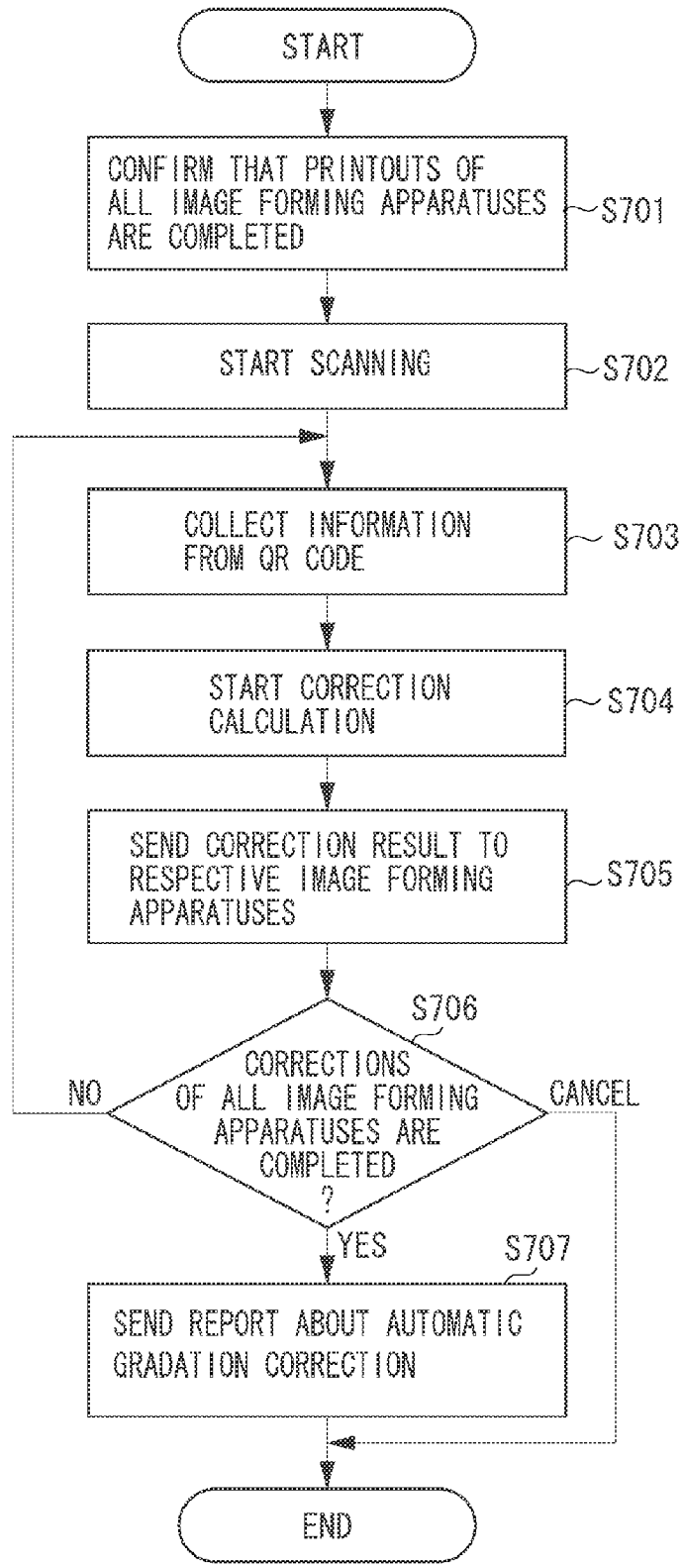
FIG. 7 is a flowchart illustrating a general outline according to the present first exemplary embodiment.

FIG. 7 is a flowchart for implementing gradation correction method through paper output. Respective processing routines of the flowchart are controlled by the automatic gradation correction unit 203 of the MFP 101 serving as the center machine.

FIG. 9, FIG. 10, FIG. 11, and FIG. 12 illustrate examples of images displayed on the UI unit 202 of the MFP 101 serving as the center machine.

In step S701, the automatic gradation correction unit 203 confirms that the gradation correction methods of all the image forming apparatuses connected on the network are determined through the processing routines in FIG. 4.

Figure 9:
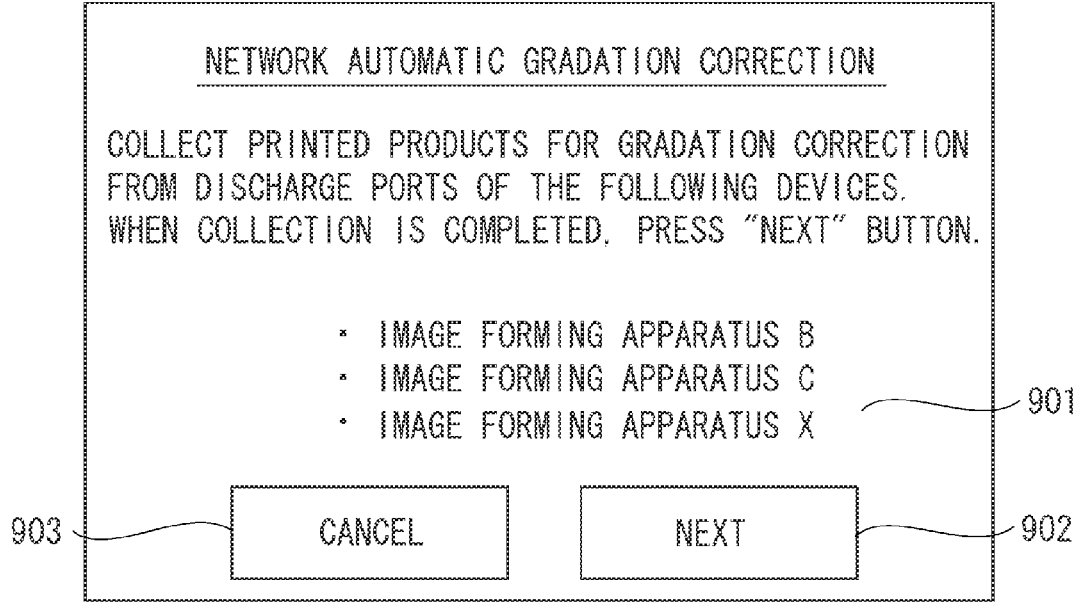
FIG. 9 illustrates an example displayed on a user interface (UI) screen.
Figure 10:
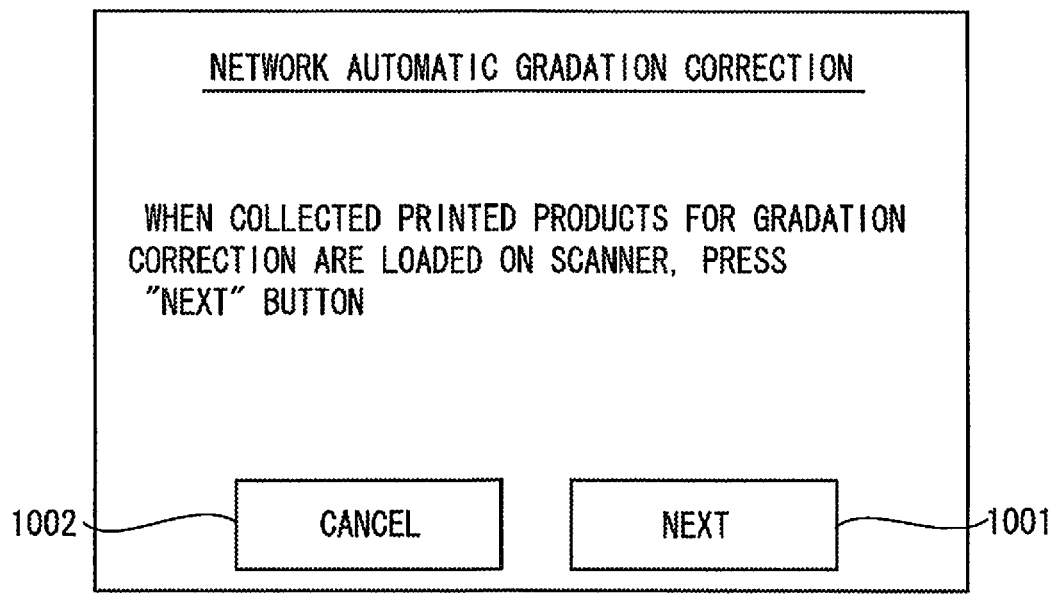
FIG. 10 illustrates an example displayed on the UI screen.
Figure 11:
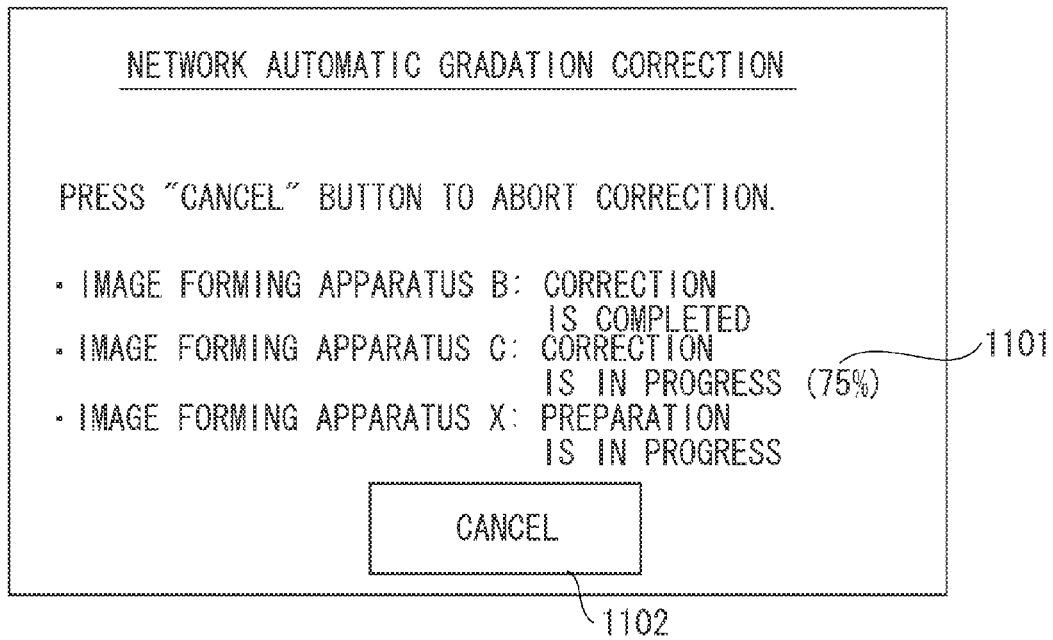
FIG. 11 illustrates an example displayed on the UI screen.
Figure 12:
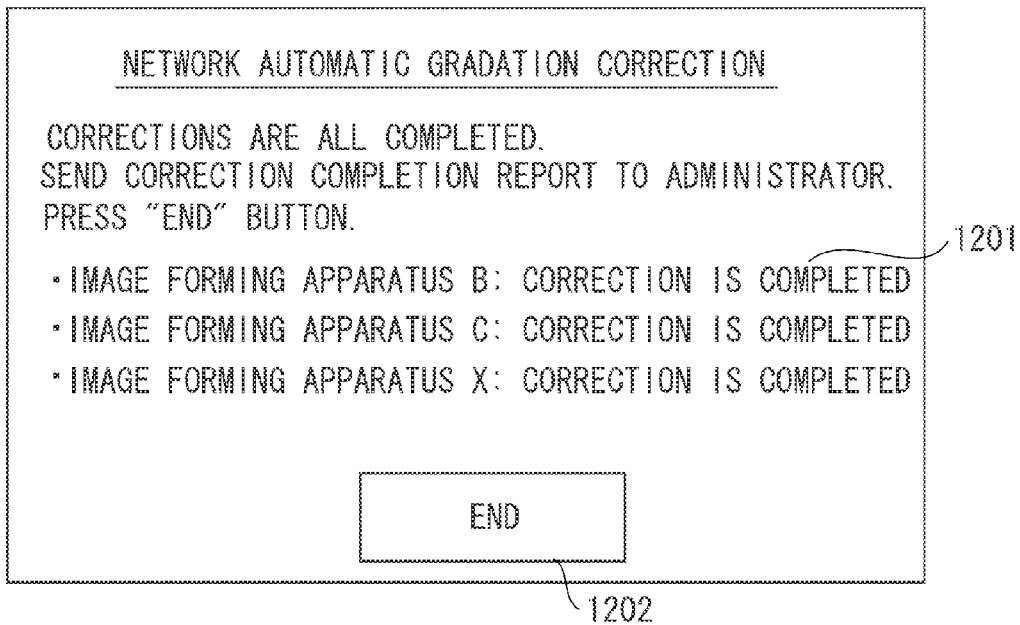
FIG. 12 illustrates an example displayed on the UI screen.

In step S702, the UI unit 202 displays the image in FIG. 9. On the image in FIG. 9, the UI unit 202 displays a name of the image forming apparatus scheduled to perform gradation correction using the printed patch patterns on a paper in an area 901. A button 903 is pressed to suspend the gradation correction using the printed patch patterns on a paper. The output prints for gradation correction are collected by the user from the paper discharge ports for respective image forming apparatuses. When a button 902 is pressed, the UI unit 202 displays the image in FIG. 10. A button 1002 is pressed to suspend the gradation correction using the printed patch patterns on a paper. The output prints for gradation correction collected by the user are placed in an auto document feeder (ADF) installed in the scanner of the MFP 101, and a button 1001 is pressed. As a matter of course, without using the ADF, the user may place the output prints on a document positioning plate, and press a button 1001.

Then, in step S702, when the automatic gradation correction unit 203 causes a scanner to start scanning via the transmission unit 205, the reception unit 301 of the input image processing unit 201 receives image data of the print output product 501 for gradation correction read out by scanning operation. Then, the image division unit 302 divides the received image data of the print output product 501 into the patch patterns 502 for gradation correction and the QR code 503.

Then, in step S703, the QR code analysis unit 303 analyzes the QR code 503, sends IP addresses and product names of the image forming apparatuses to the automatic gradation correction unit 203, via the transmission unit 305, and causes the automatic gradation correction unit 203 to store them. The data after the gradation correction is sent to the image forming apparatuses.

Next in step S704, the luminance density conversion unit 304 acquires luminance data of the patch patterns 502 for gradation correction divided by the image division unit 302, and converts the luminance data into density data. Then, the luminance density conversion unit 304 sends the data to the automatic gradation correction unit 203, via the transmission unit 305. The automatic gradation correction unit 203 that has received the density data compares the received density data and ideal density characteristics of the image forming apparatus, and converts the received density data group into ideal density characteristics. The automatic gradation correction unit 203 generates density corrections as the gradation correction data.

Then, the process proceeds to step S705, and the automatic gradation correction unit 203 sends the gradation correction data to the image forming apparatuses, via the transmission unit 205. Alternatively, the image processing apparatus, without generating the gradation correction data, may send data concerning readout values of the patch patterns to the image forming apparatuses. In this case, respective image processing apparatuses, which have received the data concerning the readout values of the patch patterns, generate the gradation correction data on the basis of the data.

Next, in step S706, the automatic gradation correction unit 203 checks whether output prints for gradation correction set up in the ADF on the scanner are present. If the print output product for gradation correction remains (NO in step S706), the processing routines in step S703 and afterward are repeated. In this case, the UI unit 202 displays an image like that in FIG. 11 according to instructions from the automatic gradation correction unit 203.

In an area 1101, a progress of corrections of the image forming apparatus that has selected the gradation correction method through paper output is indicated. When a button 1102 is pressed in step S706 (CANCEL in step S706), the automatic gradation correction unit 203 ends the network gradation correction. When the print output product for gradation correction does not remain, and transmission of all gradation correction data is completed (YES in step S706), the UI unit 202 displays an image like that in FIG. 12 according to instructions from the automatic gradation correction unit 203.

In an area 1201, it is indicated that corrections of all the image forming apparatuses for which the gradation correction method through paper output has been selected are all completed. When a button 1202 is pressed, in step S707, the automatic gradation correction unit 203 sends a report saved in the storage unit 204 via the transmission unit 205 to an administrator's mail address registered in advance.

As described above, according to the present first exemplary embodiment, instruction can be issued to determine respective situations of a plurality of image forming apparatuses that exist on the network, and to perform either gradation correction out of the gradation correction using the printed patch patterns on a paper or the internal gradation correction according to the determined result. Accordingly, it becomes possible to keep high precision of density characteristics for respective MFPs or printers, while suppressing the burden on the user.

In the first exemplary embodiment, selection of methods for gradation correction is performed, but it is desirable to reduce a number of papers of the output print for gradation correction at the time of the gradation correction using the printed patch patterns on a paper, and shorten work time.

Hence, in the present second exemplary embodiment, a method for reducing a number of papers of the output print 501 for gradation correction, when the gradation correction using the printed patch patterns on a paper is selected, will be described.

Figure 8:
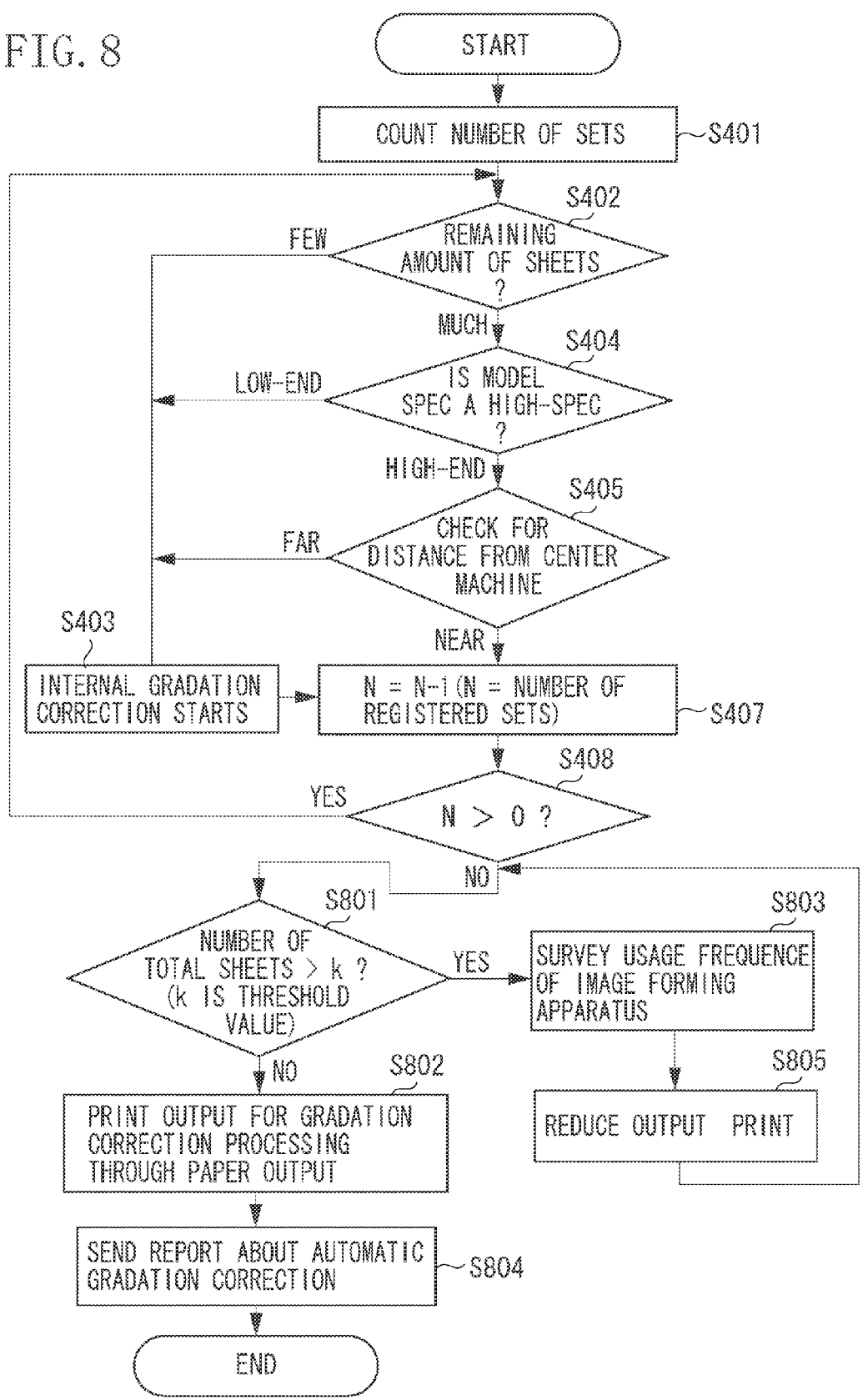
FIG. 8 is a flowchart illustrating a general outline according to the present second exemplary embodiment.

FIG. 8 illustrates a flowchart concerning the second exemplary embodiment. Respective processing routines of the flowchart are controlled by the automatic gradation correction unit 203 of the MFP 101 serving as the center machine.

Explanations about steps S401 to S408 have been described above, and descriptions thereof will be omitted here. For the image forming apparatuses for which the gradation correction using the printed patch patterns on a paper has been selected in the above-described respective steps, in step S801, the automatic gradation correction unit 203 determines whether a total number of papers of the print output product used for gradation correction scheduled to be printed out is larger than a threshold value preset by the user. If a number of papers scheduled for print is smaller than the threshold value (NO in step S801), then the process proceeds to step S802.

Then, in step S802, the automatic gradation correction unit 203 instructs via the transmission unit 205 respective image forming apparatuses to print the output product to perform the gradation corrections. If a number of papers scheduled to be used is larger than the threshold value (YES in step S801), the process proceeds to step S803. Then, in step S803, the automatic gradation correction unit 203 confirms job histories of respective image forming apparatuses.

When an output history as job history was surveyed, for example, in the printer 102, it is assumed that the print output accounted for the majority, and use of copy output was few. In such a case, regarding print processing used for the image formation used in copy output, in the image forming apparatus as the examination target, it can be determined that the gradation correction is unnecessary since copy output is used less frequently. Hence, the output print for gradation correction used for image formation in outputting the copy can be reduced, in the image forming apparatus as the survey target. More specifically, the print output of the patch patterns formed by error diffusion method to be used in copy output product is not performed.

Alternatively, when job histories are surveyed, the output prints can be reduced by surveying frequency of occurrences of objects that make up a document at the time of print output. For example, at the time of a normal print output, two types of screens (high number of lines for character object and line object in a document, and low number of lines for image object and graphics object) are used.

However, if print output of the user is such that character object and line object accounts for a major part of the document, then, mainly, a high number of lines is used and a low number of lines is not used. Hence, it can be determined that the gradation correction for the screen is unnecessary. As a result, the print output for gradation correction by the low number of lines can be reduced. More specifically, the print output of the patch patterns formed by the low number of lines used for copy output products is not performed.

Further, output prints can be also reduced by checking usage frequency on respective types of image forming methods set at the time of print output, when job histories are surveyed. The print output for gradation correction through an image forming method, which the user does not often use, can be reduced by counting types of image forming methods which the user sets with a printer driver at the time of print output.

After such an examination has been performed in step S803, the process proceeds to step S805. Then, in step S805, the automatic gradation correction unit 203 performs reduction described above on respective image forming apparatuses. Then, after the number of papers of the output print has been determined, the process returns to step S801. If a number of printed papers scheduled to be used is still larger than the threshold value (YES in step S801), then determination in step S803 is strengthened. More specifically, at the time of first determination, in a case where usage frequency is print output:copy output=9:1, output print for gradation correction concerning an image formation to be used in copy output has been reduced. However, usage frequency is print output:copy output=8:2, at the time of second determination which corresponds to strengthened determination. Even in the case where copy output is more used than the previous case, print output at the time of the gradation correction is reduced.

Further, when frequency of occurrences of objects that make up the document is surveyed, and output print is reduced depending on the result, similar determination is performed. At the time of the first determination, in case where character/line objects:image/graphic objects=9:1, print output product for gradation correction to be used for the image processing of image/graphic objects is reduced.

In addition, at the time of the second determination, even in case where character/line objects:image/graphic objects=8:2, output print for gradation correction to be used for the image processing of image/graphic objects is reduced. When print output for gradation correction is reduced through survey of image forming methods as well, at the time of the first determination, output print for gradation correction through the image forming method B is reduced in case where image forming method A:image forming method B=9:1. In addition, at the time of the second determination, print output product for gradation correction through the image forming method B is reduced, even in case where the image forming method A:the image forming method B=8:2.

If a number of output papers of print output product is determined, the process proceeds to step S802. Then, in step S802, the automatic gradation correction unit 203 instructs through the transmission unit 205 respective image forming apparatuses to print out the output print to perform gradation correction using the printed patch patterns on a paper. Next, the process proceeds to step S804, and the automatic gradation correction unit 203 creates a report as illustrated in FIG. 15. More specifically, whether the internal gradation correction has been performed, or the gradation correction using the printed patch patterns on a paper has been performed, for each of the image forming apparatuses is described in the report. Moreover, with respect to the gradation correction using the printed patch patterns on a paper, a case where an image forming method is selected is also described in the report. The automatic gradation correction unit 203 saves the report in the storage unit 204.

Figure 16:
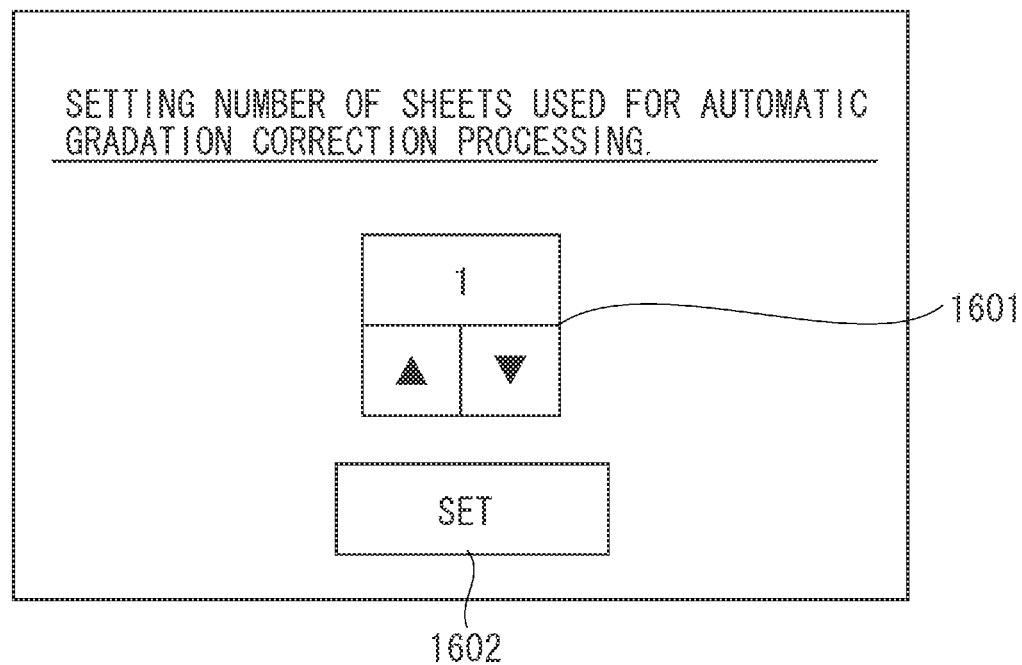
FIG. 16 illustrates an example displayed on the UI screen.

FIG. 16 illustrates an example of an image displayed on the UI unit 202 of the MFP 101 serving as the center machine. When the user presses a button 1601, a total number of papers at the time of the gradation correction using the printed patch patterns on a paper can be set. When the total number of papers has been determined, a button 1602 is pressed.

As described above, at the time of the gradation correction using the printed patch patterns on a paper, it becomes possible to shorten required work time by providing such processing that the total number of papers of print output product for gradation correction can be reduced.

While selection of methods of gradation correction is performed, in the first exemplary embodiment, it is more desirable that the image forming apparatus in which image quality receives highest priority, among the image forming apparatuses on the network, can always perform the gradation correction using the printed patch patterns on a paper.

Hence, in the third exemplary embodiment, in a case where the image forming apparatus putting highest priority on image quality exists among the image forming apparatuses on the network, processing in which respective image forming apparatuses select one of the above-described two gradation correction methods for execution will be described.

Figure 18:
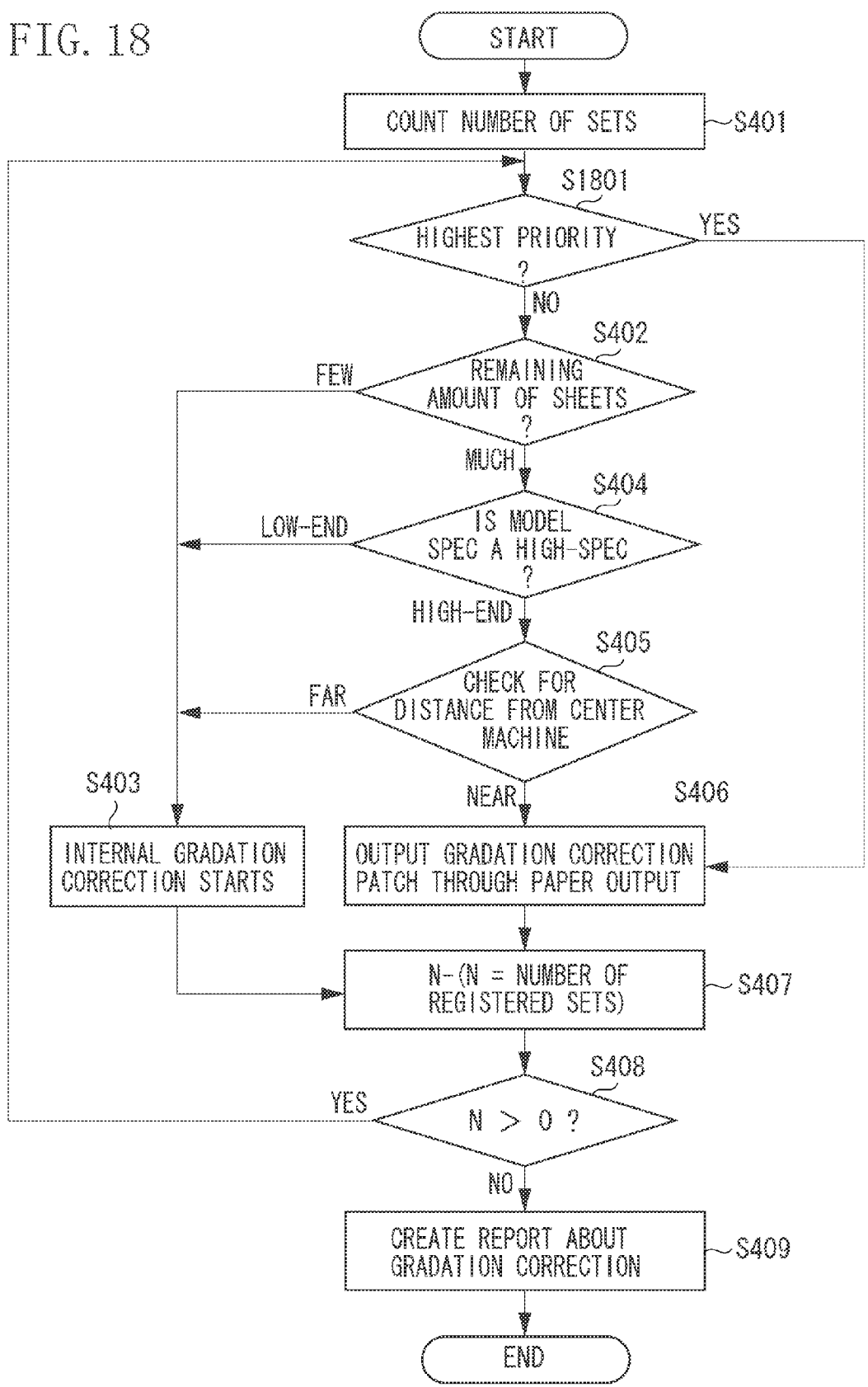
FIG. 18 is a flowchart illustrating a general outline according to the present third exemplary embodiment.

FIG. 18 illustrates a flowchart concerning the third exemplary embodiment. Explanations about steps S401 to S409 among processing routines of the flowchart, have been already described above, and will be omitted here. First, in step S1801, the automatic gradation correction unit 203 determines whether image quality receives highest priority in the image forming apparatus that becomes an examination target that selects the gradation correction method. If image quality receives highest priority (YES in step S1801), it is necessary to definitely perform the gradation correction using the printed patch patterns on a paper. Hence, the process proceeds to step S406. Then, in step S406, the automatic gradation correction unit 203 instructs through the transmission unit 205 the image forming apparatus as the examination target to perform print output for gradation correction using the printed patch patterns on a paper.

Then, in step S409, the automatic gradation correction unit 203 creates a report as illustrated in FIG. 19. More specifically, the report describes whether the internal gradation correction is to be performed, or the gradation correction using the printed patch patterns on a paper is to be performed, for each of the image forming apparatuses. Moreover, regarding the image forming apparatus which puts highest priority on image quality, the report also describes marks thereof. In the present exemplary embodiment, "★" is set down at the beginning of name of the image forming apparatus. The automatic gradation correction unit 203 saves the report in the storage unit 204.

As described above, when a method of the gradation correction is selected, it becomes possible to make setting so that the image forming apparatus which puts highest priority on image quality among the image forming apparatuses on the network, definitely performs the gradation correction using the printed patch patterns on a paper. Hereinbefore, descriptions have been given on the basis of the first exemplary embodiment, similar effects can be also obtained in the second exemplary embodiment.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-284569 filed Dec. 15, 2009, which is hereby incorporated by reference herein in its entirety.

What is claimed is:

1. An image processing apparatus connected via a network to a plurality of image forming apparatuses that implement a first gradation correction, or a second gradation correction, for instructing the connected plurality of image forming apparatuses to implement gradation corrections, the image processing apparatus comprising:
    a selection unit configured to select the first gradation correction or the second gradation correction, for each of the connected plurality of image forming apparatuses;
    an instruction unit configured to send an instruction, to an image forming apparatus connected via the network, for which a first gradation correction has been selected by the selection unit, to form patch patterns on an image carrier of the image forming apparatus, to generate gradation correction data from data of the patch patterns read out by a sensor of the image forming apparatus, and to start gradation correction, and configured to instruct an image forming apparatus connected via the network, for which a second gradation correction has been selected, to print patch patterns on paper;
    a reading unit arranged in a reading section by a user, configured to read out patch patterns that have been printed by the image forming apparatus connected via the network, for which the second gradation correction has been selected;
    a transmission unit configured to transmit data for correcting readout values of the patch patterns to the image forming apparatus connected via the network, for which the second gradation correction has been selected; and
    a survey unit configured to survey output histories of respective image forming apparatuses, to further reduce a number of papers of print output product for gradation correction, in the second gradation correction.

2. The image processing apparatus according to claim 1, further comprising a storage unit configured to store gradation correction performed by the image forming apparatus, selected by the selection unit.

3. The image processing apparatus according to claim 1, wherein the selection unit acquires at least one determination result of a remaining amount of papers for selecting an amount of papers remain in a paper feeding stage to be used when the second gradation correction is performed, a determination result of spec of the image forming apparatus, and a determination result of distance from an image processing apparatus that performs the gradation correction.

4. The image processing apparatus according to claim 1, wherein the transmission unit further includes a generation unit configured to generate gradation correction data from patch patterns arranged by the user, and sends the gradation correction data to an image forming apparatus connected via the network, for which the second gradation correction has been selected.

5. The image processing apparatus according to claim 1, further comprising
    a reduction unit configured to reduce print output product depending on a result of the survey unit.

6. The image processing apparatus according to claim 1, wherein when the image forming apparatus as an examination target has set the highest priority on image quality, the selection unit for selecting the gradation correction selects the second gradation correction.

7. A control method of an image processing apparatus connected via a network to a plurality of image forming apparatuses that implement a first gradation correction, or a second gradation correction, for instructing the connected plurality of image forming apparatuses to implement gradation corrections, the method comprising:
    selecting the first gradation correction or the second gradation correction, for each of the connected plurality of image forming apparatuses;
    sending instructions to an image forming apparatus connected via the network, for which the first gradation correction is selected, to form patch patterns on an image carrier in the image forming apparatus, to generate gradation correction data from data obtained by reading out the patch patterns by a sensor of the image forming apparatus, and to start gradation correction;
    instructing the image forming apparatus connected via the network, for which the second gradation correction has been selected, to print the patch patterns on paper;

reading out patch patterns arranged in a reading section by a user, printed by the image forming apparatus connected via the network, for which the second gradation correction has been selected;

sending data for correcting readout values of the patch patterns to the image forming apparatus connected via the network, for which the second gradation correction has been selected; and surveying output histories of respective image forming apparatuses, to further reduce a number of papers of print output product for gradation correction, in the second gradation correction.

8. The control method according to claim 7, further comprising storing the selected gradation corrections, which the image forming apparatus has performed.

9. The control method according to claim 7, further comprising acquiring at least one determination result of a remaining amount of papers for selecting an amount of papers remaining in a paper feeding stage to be used when the second gradation correction is performed, a determination result of spec of an image forming apparatus, and a determination result of distance from the image processing apparatus that performs the gradation correction.

10. The control method according to claim 7, further comprising:

generating gradation correction data from the patch patterns arranged by the user; and sending the generated gradation correction data to the image forming apparatus connected via the network, for which second gradation correction has been selected.

11. The control method according to claim 7, further comprising reducing print output product depending on the survey result.

12. The control method according to claim 7, wherein when an image forming apparatus as an examination target has set the highest priority on image quality, the selecting step selects the second gradation correction.

13. A non-transitory computer-readable storage medium storing a computer program for causing a computer to execute a method for controlling an image processing apparatus connected via a network to a plurality of image forming apparatuses that implement a first gradation correction, or a second gradation correction, for instructing the connected plurality of image forming apparatuses to implement gradation corrections, the method comprising:

selecting the first gradation correction or the second gradation correction, for each of the connected plurality of image forming apparatuses;

sending instructions to an image forming apparatus connected via the network, for which the first gradation correction is selected, to form patch patterns on an image carrier in the image forming apparatus, to generate gradation correction data from data obtained by reading out the patch patterns by a sensor of the image forming apparatus, and to start gradation correction;

instructing the image forming apparatus connected via the network, for which the second gradation correction has been selected, to print the patch pattern on paper;

reading out patch patterns arranged in a reading section by a user, printed by the image forming apparatus connected via the network, for which the second gradation correction has been selected;

sending data for correcting readout values of the patch patterns to the image forming apparatus connected via the network, for which the second gradation correction has been selected; and surveying output histories of respective image forming apparatuses, to further reduce a number of papers of print output product for gradation correction, in the second gradation correction.

* * * * *